United States Patent Office 3,536,517
Patented Oct. 27, 1970

3,536,517
PRESSURE RECORDING PROCESS
Walter August van den Heuvel, Berchem, Johan Eugeen van Halst, Wilrijk, Jozef Leonard van Engeland, St. Katelijne-Wayer, and Noel Jozef de Volder, Aarsele, Belgium, assignors to Gevaert Photo-Producten N.V., Mortsel, Belgium, a company of Belgium
No Drawing. Continuation-in-part of application Ser. No. 368,313, May 18, 1964. This application Dec. 3, 1968, Ser. No. 780,920
Claims priority, application Netherlands, May 17, 1963, 292,921; Great Britain, Nov. 20, 1968, 55,081/68
Int. Cl. B41m 5/16, 5/22
U.S. Cl. 117—36.2
19 Claims

ABSTRACT OF THE DISCLOSURE

Pressure sensitive record material for producing a durable copy image by means of a reaction system consisting essentially of (1) an oxidizing compound soluble in an aqueous medium to release hexacyanoferrate(III) ions, (2) at least one organic compound oxidizable to form a cationic dye and which is selected from the group consisting of a leuco dye compound and an aromatic primary or secondary amino compound, and (3) a compound yielding in an aqueous medium metal ions selected from the group consisting of zinc, cadmium, mercury, copper, silver, gold and lead, the record material carrying on the record areas thereof microcapsules containing an aqueous, preferably acidic, medium and at least one, but not more than two, of such reactants, the remainder of the reactants being provided on the material adjacent the microcapsules. The microcapsules and the remaining reactants can be disposed on the same surface of a single sheet or opposite surfaces of plural sheets of a manifold set. When the reactants come into contact upon rupture of the capsules in the area according to the image to be copied, the hexacyanoferrate(III) ions are reduced to hexacyanoferrate(II) ions which combine with the metal ions to form a water-insoluble precipitate strongly absorbing the cationic dye formed by oxidation of the organic compound.

---

This application is a continuation-in-part of the United States patent application S.N. 368,313, filed May 18, 1964, now Pat. No. 3,432,329, issued Mar. 11, 1969.

The latter United States patent application contains the statement that the mehod for obaining erasure-proof ink prints and ink images can be used in the mostly diversified recording and developing techniques, wherein zinc ions providing recording elements are used, but that the process is especially suited for the use of liquid development techniques which can be applied or which are applied to the development of electrostatic charge patterns onto layers containing zinc oxide, more particularly layers containing photoconductive zinc oxide dispersed in an insulating binding agent.

In the said United States patent application a method is claimed of producing erasure-resistant images on the surface of a record element, which comprises the steps of providing at least the surface of said element with a compound releasing zinc ions in aqueous solution and contacting said surface with an image pattern of an aqueous developing liquid having a pH not greater than pH 7 and consisting essentially of water and a leuco compound of a cationic dye which compound forms a coloured dye upon oxidation, the amount of said leuco compound being such that the thus formed dye has visible colouration, said liquid and said surface being contacted in the presence of hexacyanoferrate(III) ions in sufficient amount to oxidize said leuco compound to said coloured dye, whereby an image pattern of said coloured dye is produced on said record element surface.

The present invention relates to a recording process in which the same colour reaction as described in the said United States patent application S.N. 368,313 is used and contains additional features which makes it a modification of the invention as broadly stated above.

More particularly the present invention relates to "a pressure-activatable image-forming process" and to materials used therein.

By "pressure-activatable image-forming process" is meant that a visible image is produced by pressure applied in the form of "information." The term information includes simultaneously applied information in the form of a pattern and all types of graphic signals, characters and pressure signals applied in successive order as, e.g., in writing or in recording Morse signals on tape and the like.

The materials used to perform the process of the present invention are single sheet materials or sets of sheet materials incorporating different chemical compounds, which in the pressure-struck area can react with each other and provide therein a visible change of colour.

Single sheet pressure-sensitive record sheets are known, e.g., from the United Kingdom Patent Specification 1,042,596. The pressure-sensitive sheets described therein are self-generating image-forming sheet materials including separated image-forming co-reactants, which form visible images on contact with one another. In practice, one of the co-reactants is incorporated into a water-immiscible liquid fill contained in minute, hollow, rupturable capsules that are insoluble but dispersable in water and have shells of urea-formaldehyde polymer. The capsules are incorporated into a coherent web on a paper-making machine and are withheld in the interstitial spaces of the web.

The other co-reactant is carried by the web adjacent to the capsules. The co-reactant may be incorporated, e.g., as a solid component during the formation of the sheet material but may be added also after the sheet has been formed, e.g. from a solution.

Other pressure-sensitive sheets are known under the name NCR (a trademark of the National Cash Register Company)-paper (No Carbon Required). NCR-paper is a chemically coated bond paper, which provides clean clear copies without the use of carbon paper or interleaving sheets of any kind. Three different types of coated paper in a manifold paper pack make up the NCR-paper system. The top sheet of the CB-paper (coated back) has a colouring coating on its back; the intermediate sheet or CFB-paper (coated front and back) has a receiving chemical coating on its front side and the former colouring coating on the back. The third sheet or CF-paper (coated front) contains the receiving chemical on the front, but has no coating on the back. The impact of a typewriter key or the pressure of a pencil on the first sheet presses the chemical on the CB-paper into contact with the chemical coating on the front side of the CFB-paper and the resulting reaction produces a coloured print. The chemical of the transferable colouring coating on the back of the CFB-paper is transferred by pressure to the co-reactant(s) on the CF-paper.

Up to five hand-written copies can be obtained. Six to eight copies can be produced with a common typewriter and more than eight copies with an electric typewriter. The application of NCR-paper includes account listings, tabulator forms, Teletype rolls, adding-machine rolls, note blocks, etc.

It is an object of the present invention to provide improved pressure-sensitive record sheets. Said sheets may be of the self-generating image type as well as of the so-called "No Carbon Required" type (NCR) applied in a manifold pack.

The present invention more particularly includes the use in a pressure-recording process of a colour reaction, which is produced by means of (1) A reactant being an oxidizing agent e.g. a compound yielding hexacyanoferrate(III) ions, (2) A co-reactant being an oxidizable organic compound selected from the group consisting of a leuco compound of a dye and an amino compound (in free base or salt form) which is a primary or secondary amino group linked to a carbon atom making part of a conjugated system.

According to a preferred embodiment the colour reaction is activated by means of (3) A compound providing metal ions selected from the group consisting of zinc, cadmium, mercury, copper, silver, gold and lead. The zinc ions react with the hexacyanoferrate(II) ions produced by the reduction of the hexacyanoferrate(III) ions and form water-insoluble zinc hexacyanoferrate(II), which possesses strong adsorbing properties for cationic dyes.

According to the present invention at least one of the said reactants (1), (2), or (3) is kept apart from the necessary co-reactant(s) by means of a pressure-rupturable material that under normal pressure conditions prevents said colour reaction.

It is possible to apply the oxidant i.e. the hexacyanoferrate(III) compound in direct contact with the dye-forming oxidizable compound i.e. the leuco compound or amine without considerable premature reaction if the pH of the mixture is kept below 7, preferably near 2. In that case the colour reaction is catalyzed i.e. started and promoted by the mentioned metal ions, preferably zinc ions. The pH of the mixture of hexacyanoferrate(III) ions and oxidizable substance is kept below 7 by means of, e.g., the acid compounds used for the stabilization of diazotype materials such as the acid stabilizers described in the United States patent specifications 3,076,707 and 3,298,834.

According to a preferred embodiment all or at least one of the said reactants (1), (2) or (3) is encapsulated separately into pressure-sensitive envelopes preventing the colour reaction under normal pressure conditions.

The present invention does not exclude, however, the use of two of said reactants in one and the same capsule shell. In that case, however, said reactants are in such conditions that the colour reaction cannot take place before the capsule ruptures and before they come into contact with the necessary co-reactant.

In principle all techniques known in the art for encapsulating solids or liquids can be applied for the purpose of the present invention. Broadly speaking, however, three types of encapsulating techniques can be considered according to the type of the material to be encapsulated, viz.:

(A) encapsulation of an aqueous phase,
(B) encapsulation of an organic lipophilic phase, and
(C) encapsulation of finely divided solid substances.

Since the colour reaction applied according to the present invention proceeds very quickly in a liquid medium, which is a solvent for hexacyanoferrate(III) ions and/or said metal ions, some water and/or other liquid, e.g. glycerol, allowing the existence of said ions in free state is incorporated into the recording material so that said liquid stands in contact with at least one of the reactants or by the rupture of the pressure-sensitive shielding material can come into contact with all the reactants.

According to a preferred embodiment some water is encapsulated together with at least one of the reactants. In order to prevent or retard the removal of water from the recording material by evaporation on storage as much as possible it contains (a) hygroscopic compound(s) or water-retaining compounds e.g. 1,2-dihydroxyethane, glycerol, (an) aqueous gel-forming compound(s), e.g. pectine, or (a) hygroscopic salt(s), e.g. magnesium chloride, and (a) compound(s) with a substantial amount of crystal water, e.g. sodium tetraborate-10-water $$(Na_2B_4O_7 \cdot 10H_2O).$$

Suitably techniques for the encapsulation of water or an aqueous phase are described in the United Kingdom patent specifications 898,668; 929,403; 929,470; 1,048,696 and 1,048,697. The possibility of encapsulating one of the reactants in an organic phase or as a solid, however, is not excluded. For the organic phase encapsulation reference is made to the United Kingdom patent specifications 1,042,596, 1,048,697, the United States patent specification 2,712,507, the Canadian patent specification 636,970 and the French patent specifications 1,304,891 and 1,312,868. For the solid phase encapsulation reference is made to the United Kingdom patent specification 920,866, the published Dutch patent application 6611661 and the Canadian patent specification 627,609.

According to a particular embodiment a new pressure-sensitive sheet can be formed by including microscopically small pressure-rupturable capsules, preferably no larger than 50 microns, and containing one or two of the reactive components (1), (2) and (3) into a paper-forming slurry or wet stock of any paper-forming fibres from which a web of unified fibres is manufactured.

The capsules are thoroughly mixed into the slurry or paper stock before application of the slurry to the paper-making machine. By a proper selection of capsule shell material, the capsules remain unruptured and are readily retained in the wet slurry when the latter is deposited on a paper wire for forming a unified web and become an integral part of the web without requiring any binder in addition to the paper-forming pulp itself.

In a pressure-activatable, self-generating, image-forming sheet at least one of the co-reactants for the reactants contained in the capsules is included in the sheet material in such a manner that they are adjacent to the capsules or stand in such relationship to each other that they can reach each other by diffusion, so that upon release of a liquid from the capsules a reaction takes place to provide a coloured mark in correspondence with the pressure applied.

According to a particular embodiment of the present invention a NCR-manifold paper system is built up. The CB-paper of said system is coated on its rear-side with a pressure-transferable composition e.g. on the basis of a frangible hydrophilic colloid layer or pressure-adhesive layer containing one or two of said compounds (1), (2) or (3) whereas the front side of the CFB-paper is coated with a capsule layer which is made adhering thereto. Of course, the capsules contain the proper co-reactant(s) for the reactant(s) of the CB-paper. The CF-paper contains on its front side the same encapsulated reactant(s) as the front side of the CFB-paper. The CFB-paper contains on its rearside the same transferable reactant as the backside of the CB-paper.

The encapsulation of aqueous compositions or water proceeds very advantageously according to the encapsulating technique described in the United Kingdom patent specification 1,048,696. The encapsulating material preferably consists of a hydrophobic polymer that forms a water-in-soluble capsule shell. Polymers suited for use in the invention are, e.g., addition polymers formed by polymerisation or copolymerisation of vinyl monomers such as styrene, vinyl chloride, vinylidene chloride, vinyl alcohol esters, vinyl ethers, acrylic acid esters and methacrylic acid esters, acrylonitrile and methacrylonitrile and other $\alpha,\beta$-unsaturated monomers forming water-insoluble polymers. Further are mentioned condensation polymers such as water-insoluble polyesters, polyamides and polyester-amides, e.g. polycarbonates, polycarboxylic acid esters of aliphatic diols and/or bisphenols, alkyd resins, polysulphonates, polyphosphonates and polyamide compounds derived from aliphatic amines. Still further are mentioned addition polymers such as polyurethanes and chemically modified, e.g. hydrophobized, natural polymers e.g. chlorinated natural rubber and etherified cellulose, e.g. ethylcellulose.

According to the process described in said United Kingdom Patent Specification microcapsules comprising water, another aqueous material, or (a) hydrophilic substance(s) in a solid mantle of polymeric material are formed by:

(a) Emulsifying or dispersing the aqueous material or hydrophilic substance(s) in a solution of a polymeric material, the solvent for the latter being a water-immiscible organic solvent having a boiling point lower than 100° C.,
(b) Emulsifying the emulsion or dispersion obtained in an aqueous solution of a hydrophilic colloid, and (c) removing the solvent for the polymeric material by evaporation.

The thickness of capsule shell and its rupturability can be controlled by the volume ratio of the liquid phase to be encapsulated to the hydrophobic (water-immiscible) phase. The lower that ratio the more thin the capsule shells will be.

With regard to the dye-forming reaction applied in the present invention it has to be noticed that the zinc ions do not form a coloured product but speed up the oxidation of the leuco compounds and of said aromatic amines by hexacyanoferrate(III) ions in that they form zinc hexacyanoferrate(II), which is a water-insoluble compound having a strong adsorption power for cationic dyes. Such dyes are formed in acid medium in the colour reaction applied in the present invention.

Thanks to the strong adsorption of cationic dyes to th ein situ produced zinc hexacyanoferrate(II) precipitate very water-resistant and erasure-proof colour images are produced.

In selecting a proper leuco dye, aromatic amino compound of mixture of such compounds any colour can be produced. This may be interesting for producing successive pressure prints in different colours.

Examples of leuco compounds used according to the present invention are:

(A) Leuco compounds of the carbenium salts:

(1) Leuco compounds of triarylcarbenium salts e.g. leuco compounds of triphenylmethane dyes, represented for instance by the structural formulae:

(1)

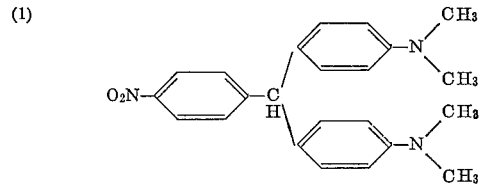

(2)

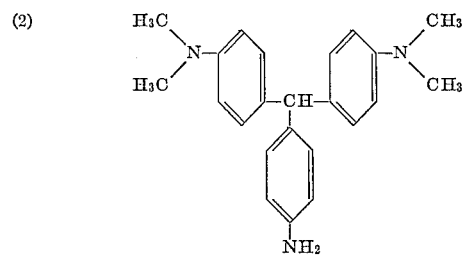

(3)

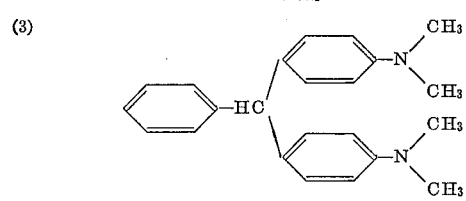

(4)

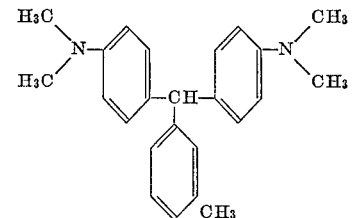

(5)

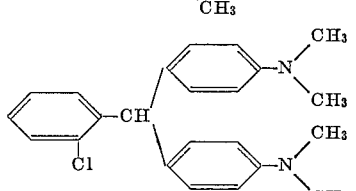

(6)

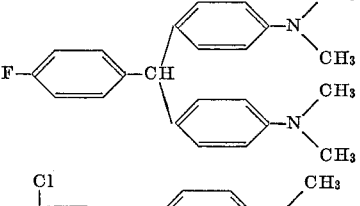

(7)

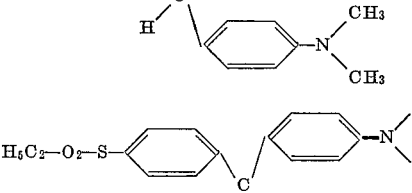

(8)

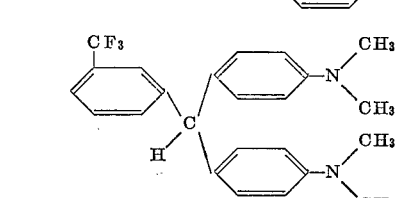

(9)

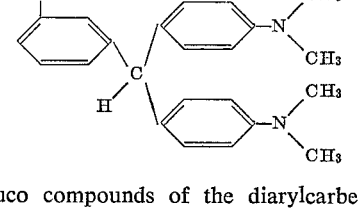

(10)

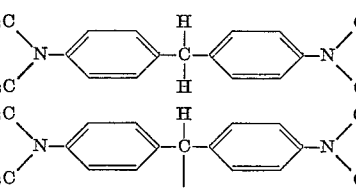

(2) Leuco compounds of the diarylcarbenium salts, also named leuco compounds of diphenylmethane dyes. Diphenylmethane dyes with open structure, such as:

(11)

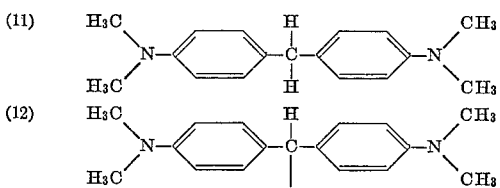

(12)

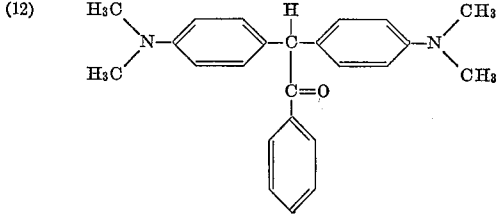

(3) Leuco compounds of diphenylmethane dyes with ring structure, such as:

(13) 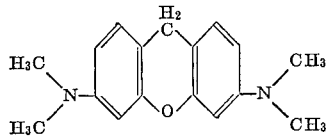

(14) 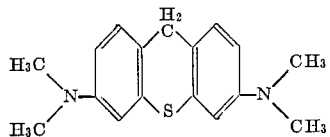

(15) 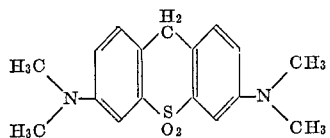

(B) Leuco compounds of the azenium salts:
(1) Leuco compounds of diarylazenium salts without ring closure, such as:

(16) 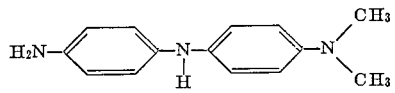

(17) 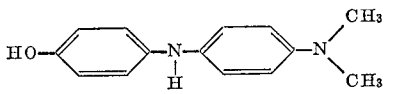

(2) Leuco compounds of diarylazenium salts comprising a ring, which is closed by an oxygen atom, also named leuco compounds of oxazine dyes, such as:

(18) 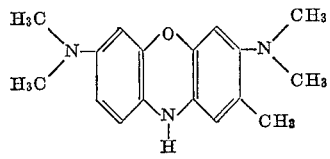

(3) Leuco compounds of diarylazenium salts comprising a ring closed by a sulphur atom, also named leuco compounds of thiazine dyes, such as:

(19) 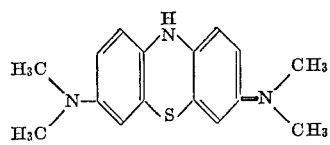

(20) 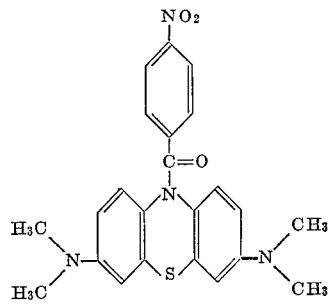

(21) 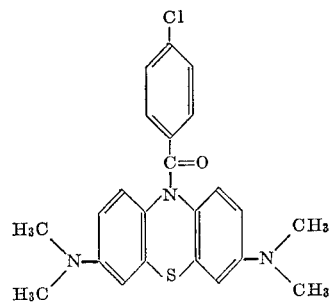

(22) 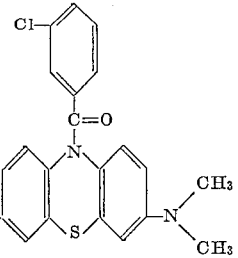

(4) Leuco compounds of diarylazenium salts with ring closure by an —NH— or —N(alkyl)-group such as:

(23) 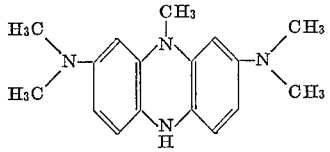

(C) Leuco compounds of carbonyl dyes:
(1) Leuco compounds of indigo dyes such as:

(24) 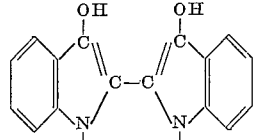

(25) 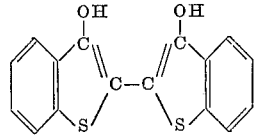

(26) 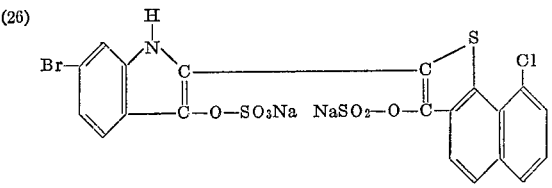

(27) 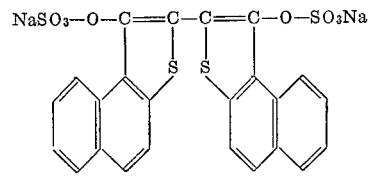

(28) 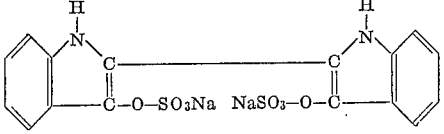

(29) 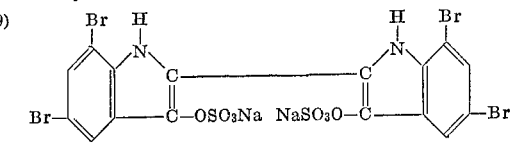

(30) 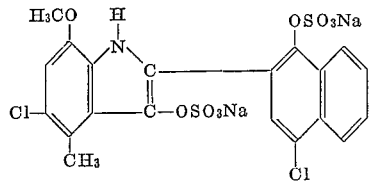

Amines that may be used in the process according to the present invention include those in which the amino group is present as a substituent on a carbon atom that forms part of a conjugated system.

Preferred amines are aromatic compounds, which contain at least one primary amino group, and in which at least one ortho-position in respect of the amino group is left unsubstituted. In the other positions the aromatic system may be substituted by one or more substituents in such a way that the sum of the δ-values of the further substituents preferably is not lower than 0.66 and equals or is not larger than +0.874 (see "δ—Values for Anilines" H. R. Jaffe, Chem. Rev. 53 (1953) p. 222, table 7, and p. 225).

As examples of such primary amines are mentioned those corresponding to one of the formulae:

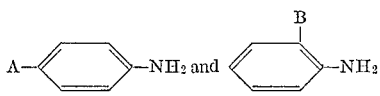

wherein:

A is a halogen atom, e.g. chlorine or bromine, a $C_1$–$C_5$ alkyl radical, e.g. methyl, an acetylamino group or an acetyl group, and B is a hydroxyl group or a primary amino group.

Substituents of the aromatic system rings of the amines used in the process of the invention may form part of a fused aromatic cycloaliphatic or heterocyclic ring.

Examples of particularly useful aromatic primary amines that may be used in the process of the invention are the following:

2-methyl-4-diethylaminoaniline,
p-diethylaminoaniline,
p-dimethylaminoaniline,
2,4,6-triaminochlorobenzene,
2,4-dimethylaniline,
3,4-diaminophenol,
2,4-diaminophenol,
p-phenitidine,
veratrylamine,
2,5-dimethoxyaniline,
aniline,
4,4'-diaminodiphenylamine, and
α-amino-β-naphthol.

Examples of heterocyclic primary amines that may be used in the process of the invention include 2-aminobenzothiazole, 5-aminobenzothiazole and 6-aminobenzothiazole.

Secondary aromatic amines that may be used in the process of the invention include N-monomethyl-aniline and diphenyl-amine. Non-coloured amines have the advantage over coloured amines in that a richer assortment of brighter colours can be generated.

The hexacyanoferrate(III) ions used as an oxidizing agent are provided preferably by a water-soluble alkali metal hexacyanoferrate(III) e.g. of potassium.

The encapsulated liquids for use according to the present invention preferably include water and possibly contain (a) thickening agent(s) for adjusting the viscosity.

Substances that slow down the evaporation of the water i.e. the drying out of the capsules are preferably applied in the capsule fill in a rather high concentration in respect to the water, e.g. 25% by weight. Examples of such substances include hygroscopic salts, e.g. magnesium chloride, glycerol, glycol, and sorbitol, and also hydrophilic colloids, e.g. gum arabic, carboxymethylcellulose, pectine, caseine, poly(vinyl alcohol) and poly-N-vinylpyrrolidone. Further have to be mentioned silicates, colloidal silica and silicic acid.

The following examples illustrate the present invention.

EXAMPLE 1

In a 5 l. three-necked flask placed on a water bath and equipped with a thermometer, a high speed mechanical stirrer and a dropping funnel were placed 200 cc. of 15% solution of polystyrene in methylene chloride. Whilst vigourously stirring a mixture of 2 cc. of a 10% aqueous solution of gelatin and 30 cc. of a 30% aqueous solution of potassium hexacyanoferrate(III) were added to the polystyrene solution and emulsified therein.

To this emulsion 1000 cc. of 1% aqueous solution of gelatin having a temperature of 30° C. and a pH 6 were added in 5 sec., while stirring was continued. Thereupon the temperature of the water bath was increased gradually till 45–55° C. and the methylene chloride evaporated. After the complete removal of the methylene chloride 1500 cc. of water of 10° C. were added whereupon stirring was stopped. The capsules were filtered with suction. They did not contain a water-attracting compound and consequently were relatively sensitive to drying out under normal atmospheric conditions.

When an Ultra Turrax (trade name) high speed mixer was used, the capsules obtained had a particle size of about 200μ. The thus formed capsules were applied in wet state to a porous paper sheet. According to an other embodiment they were stuck to a heated paper sheet provided with a wax or polymer layer having adhesive properties in warm state (for such layers see the United Kingdom patent specification 1,051,413 and the United States patent specifications 3,196,029 and 3,290,612.

When the capsule size was reduced till 50μ and less by a more effective emulsification, the capsules were suited to be incorporated in a paper slurry for making a pressure-sensitive paper.

A mixture of capsules and paper fibres was prepared to form an aqueous slurry of about 5% pulp solids and was agitated to ensure a uniform distribution of components in the slurry. According to a common paper-making technique, a pressure-sensitive paper of 60 g. per sq. m. was produced, which was impregnated with an aqueous acid solution (pH 3) of leuco crystal violet and zinc chloride, and dried.

By typing on several superposed sheets of capsule-containing paper, sharp, contrastly blue images appeared on each sheet. The paper could be wound into roll form and handled fairly roughly without premature rupture of capsules.

A suitable ratio of paper compounds was:

| Parts by wt. (dry wt.): | Material |
|---|---|
| 100 | Pulp. |
| 25 | Capsules. |
| 15 | Sodium rosinate. |
| 2 | Zinc chloride. |
| 5 | Leuco crystal violet. |

According to a modified encapsulation, the encapsulatable phase incorporated glycerol as water-attracting compound, water and potassium hexacyanoferrate(III) in a weight ratio of 25:65:10.

EXAMPLE 2

The encapsulation of Example 1 was repeated but instead of 30 cc. of 30% aqueous solution of potassium hexacyanoferrate(III) a 30% aqueous solution of cadmium chloride was used.

EXAMPLE 3

The encapsulation of Example 1 was repeated but instead of 30 cc. of 30% aqueous solution of potassium hexacyanoferrate(III) 10 g. zinc chloride and 10 g. of magnesium chloride-6-water dissolved in 30 ml. of water were used.

EXAMPLE 4

The encapsulation of Example 1 was repeated but instead of 30 cc. of 30% aqueous solution of potassium hexacyanoferrate(III) 10 g. of zinc chloride and 0.1 g. of pectine dissolved in 30 cc. of water were used.

EXAMPLE 5

The encapsulation of Example 1 was repeated but instead of 30 cc. of 30% aqueous solution of potassium hexacyanoferrate(III) 30 cc. of 1% aqueous solution of 4,4' - bis - dimethylamino - 4" - sulphomethyl - triphenylmethane acidified with hydrochloric acid to a pH 2 was used.

The capsules were mixed with capsules containing hexacyanoferrate(III) ions and applied to a paper sheet soaked with zinc chloride. Green waterproof prints were obtained by rupturing the capsules on the paper.

EXAMPLE 6

The encapsulation of Example 1 was repeated but instead of 30 cc. of 30% aqueous solution of potassium hexacyanoferrate(III) 30 cc. of 2% aqueous solution of p-ethoxyaniline hydrochloride was used.

The capsules were applied to a porous paper soaked with an aqueous potassium hexacyanoferrate(III) solution containing also zinc chloride. Blue waterproof prints were obtained by rupturing the capsules on the paper.

EXAMPLE 7

In a manifold paper system potassium hexacyanoferrate(III) was applied in a transferable frangible starch layer on the back of a CB-paper. Said paper was combined in a manifold pack with a CFB-paper having at the front polystyrene shell capsules with an aqueous leuco crystal violet fill and comprising zinc acetate in the paper mass. To the back of the CFB-paper a transferably frangible starch layer comprising zinc acetate and potassium hexacyanoferrate(III) was applied. The front of the CF-paper was coated with leucomalachite green in polystyrene shell capsules, which were stuck to said layer by means of a polyethylene sebacate layer becoming tacky on heating. The polyethylene sebacate had an intrinsic viscosity $[\eta]$ of 0.70 dl./g. measured at 25° C. in sym.-tetrachloroethane.

We claim:

1. A pressure-sensitive self-contained single sheet record material for forming a durable copy image by means of a reaction system consisting essentially of the following reactants:
   (1) an oxidizing compound soluble in an aqueous medium to release hexacyanoferrate(III) ions,
   (2) at least one organic compound oxidazable to form a cationic dye and which is selected form the group consisting of a leuco dye compound with an aromatic primary or secondary amino compound, and
   (3) a compound yielding in an aqueous medium metal ions selected from the group consisting of zinc, cadmium, mercury, copper, silver, gold and lead,
said sheet material carrying pressure-rupturable microcapsules generally uniformly within the record area thereon, said microcapsules having walls of water-insoluble hydrophobic polymer and containing an aqueous ionizing medium and at least one but not more than two of said reactants, the remainder of such reactants being disposed on said sheet material in adjacent relation to said microcapsules, whereby upon the application to said material of pressure in an area according to the image to be recorded, said capsules are ruptured in the image area, releasing the capsule contents and bringing said reactants into contact in the presence of said medium, said hexacyanoferrate(III) ions being reduced to hexacyanoferrate(II) ions which combine with said metal ions to form a water-insoluble precipitate strongly absorbing the dye formed by oxidation of said organic compound.

2. A sheet material according to claim 1, wherein the aqueous ionizing medium includes a hygroscopic compound.

3. A sheet material according to claim 1, wherein said microcapsules contain said hexacyanoferrate(III) compound in admixture with the oxidizable compound and said medium has a pH below 7.

4. A sheet material according to claim 1, wherein said compound providing hexacyanoferrate(III) ions is contained within said capsules.

5. A sheet material according to claim 1, wherein said organic dye-forming compound is contained within said capsules.

6. A sheet material according to claim 1, wherein said compound providing said metal ions is contained within said capsules.

7. A sheet material according to claim 1, wherein a mixture of said compound providing hexacyanoferrate(III) ions and a compound providing zinc ions, is contained within said capsules.

8. A sheet material according to claim 1, wherein a mixture of a compound providing said metal ions and said organic dye-forming compound is contained within said capsules.

9. The sheet material of claim 1 wherein said aqueous imaging medium has a pH below 7.

10. The sheet material of claim 1 wherein said record material comprises a fibrous web support and said microcapsules are distributed within the fibers of said support.

11. A pressure-sensitive multi-sheet manifold record material for forming a durable copy image by means of a reaction system consisting essentially of the following reactants:
   (1) an oxidizing compound soluble in an aqueous medium to release hexacyanoferrate(III) ions,
   (2) at least one organic compound oxidizable to form a cationic dye and which is selected from the group consisting of a leuco dye compound and an aromatic primary or secondary amino compound, and
   (3) a compound yielding in an aqueous medium metal ions selected from the group consisting of zinc, cadmium, mercury, copper, silver, gold and lead,
said material comprising (a) a first sheet carrying on its reverse surface generally uniformly within the record area thereof pressure rupturable microcapsules having walls of water-insoluble hydrophobic polymer, said microcapsules containing an aqueous ionizing medium of at least one but not more than two of said reactants, and (b) a second sheet in infra-posed relation to said first sheet and carrying on its obverse surface generally uniformly within the record area thereof the remainder of said reactants, whereby upon the application to said material of pressure in an area according to the image to be recorded, said capsules are ruptured in the image area, releasing the capsule contents and bringing said reactants into contact in the presence of said medium, said hexacyanoferrate(III) ions being reduced to hexacyanoferrate(II) ions which combine with said metal ions to form a water-insoluble precipitate strongly absorbing the dye formed by oxidation of said organic compound.

12. A sheet material according to claim 11, wherein the aqueous ionizing medium includes a hygroscopic compound.

13. A sheet material according to claim 11, wherein said microcapsules contain said hexacyanoferrate(III) compound in admixture with the oxidizable compound and said medium has a pH below 7.

14. A sheet material according to claim 11, wherein said compound providing hexacyanoferrate(III) ions is contained within said capsules.

15. A sheet material according to claim 11, wherein said organic dye-forming compound is contained within said capsules.

16. A sheet material according to claim 11, wherein said compound providing said metal ions is contained within said capsules.

17. A sheet material according to claim 11, wherein a mixture of said compound providing hexacyanoferrate(III) ions and a compound providing zinc ions, is contained within said capsules.

18. A sheet material according to claim 11, wherein a mixture of a compound providing said metal ions and said organic dye-forming compound is contained within said capsules.

19. The manifold record material of claim 11, wherein said second sheet carries on the reverse surface thereof pressure-rupturable microcapsules similar to said first sheet and including a third sheet carrying on its obverse face the remainder of said reactants.

References Cited

UNITED STATES PATENTS

| | | | |
|---|---|---|---|
| 2,215,196 | 9/1940 | Schlack | 8—29 |
| 2,505,471 | 4/1950 | Green | 117—36.2 |
| 2,548,366 | 4/1951 | Green et al. | 117—36.2 |
| 2,711,375 | 6/1955 | Standberg | 117—36.2 |
| 2,755,203 | 7/1956 | Stallmann | 117—36.2 X |
| 2,800,457 | 7/1957 | Green et al. | 117—36.2 X |
| 2,935,938 | 5/1960 | O'Sullivan | 117—36.2 X |

OTHER REFERENCES

Diserens, Louis, Paul Wengraf and Herman Baumann, "The Chemical Technology of Dyeing and Printing," volume 2, Rheinhold Publishing Corp. 1951 pages 92–94.

Knecht, Edmund and James Fothergill, "The Principles and Practice of Textile Printing," fourth edition 1953, Charles Griffin & Co. Limited pages 234–236 and 777.

WILLIAM D. MARTIN, Primary Examiner

E. J. CABIC, Assistant Examiner

U.S. Cl. X.R.

8—2.5, 7, 30, 31, 32, 34, 79, 99; 117—36.8, 155